Apr. 3, 1923.

J. J. HUEBNER 1,450,370

SPRING SUSPENSION FOR VEHICLE BODIES

Filed Oct. 26, 1921   3 sheets-sheet 1

INVENTOR.
Julius J. Huebner
BY William M. Swan
ATTORNEY.

Apr. 3, 1923.  
J. J. HUEBNER  
1,450,370  
SPRING SUSPENSION FOR VEHICLE BODIES  
Filed Oct. 26, 1921   3 sheets-sheet 2

INVENTOR.  
BY Julius J. Huebner  
William M. Cowan  
ATTORNEY.

Apr. 3, 1923. 1,450,370
J. J. HUEBNER
SPRING SUSPENSION FOR VEHICLE BODIES
Filed Oct. 26, 1921    3 sheets-sheet 3

INVENTOR.
BY Julius J. Huebner
William M. Swan
ATTORNEY.

Patented Apr. 3, 1923.

1,450,370

UNITED STATES PATENT OFFICE.

JULIUS J. HUEBNER, OF DETROIT, MICHIGAN.

SPRING SUSPENSION FOR VEHICLE BODIES.

Application filed October 26, 1921. Serial No. 510,595.

*To all whom it may concern:*

Be it known that I, JULIUS J. HUEBNER, a citizen of the United States, residing at Detroit, county of Wayne, State of Michigan, have invented a certain new and useful Improvement in Spring Suspension for Vehicle Bodies, and declare the following to be a full, clear, and exact description of the same, such as will enable others skilled in the art to which it pertains to make and use the same, reference being had to the accompanying drawings, which form a part of this specification.

This invention relates to spring suspension for vehicle bodies, and has for its object an improved organization of parts, which while of relatively low cost, both for materials and installation, functions to a highly efficient degree in cushioning the road jolts transmitted through the traction wheels, and in effecting the proper distribution of the weight of the vehicle's load relatively to the axles.

In the drawings:

Figure 1 is a front elevational view of a vehicle axle and body, correlated by means of my improved construction.

Figures 2 and 2ᵃ represent in plan view the right and left hand ends of an axle with my improved spring construction applied thereto.

Figure 1:
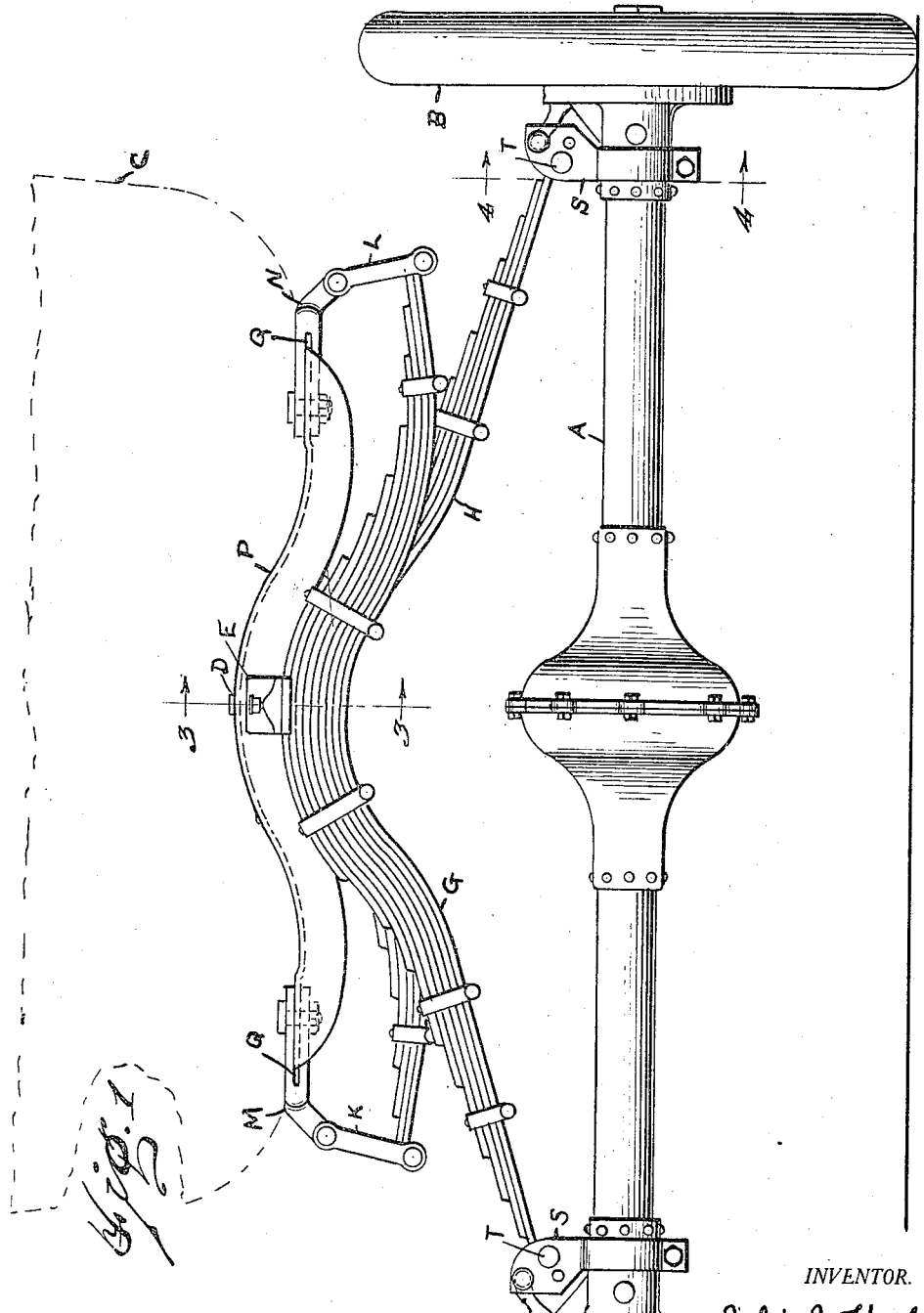

A indicates the axle of the motor vehicle, on whose ends are carried the traction wheels B, and above which there is indicated in Figure 1 the desired relative position of the vehicle body C. From the under face of the vehicle body is suspended, by means of the bolt D, a yoke member E, which runs lengthwise of the vehicle sufficiently so that the adjacent upper curvate portion of each of the leaf springs G and H slidably engages the adjacent under face of the yoke E. Lubrication may, if desired be effected through the medium of the threaded lubricant cups F. The upper end of each spring G and H is connected by means of shackles K and L with the goose-neck members M and N respectively, which later are in turn bolted to the ends of the cross bar P, but thanks to the slots Q in which the bolts engage, these latter members are capable of limited slidable movement transversely of the vehicle and lengthwise of the cross bar P and of themselves.

Figure 2:
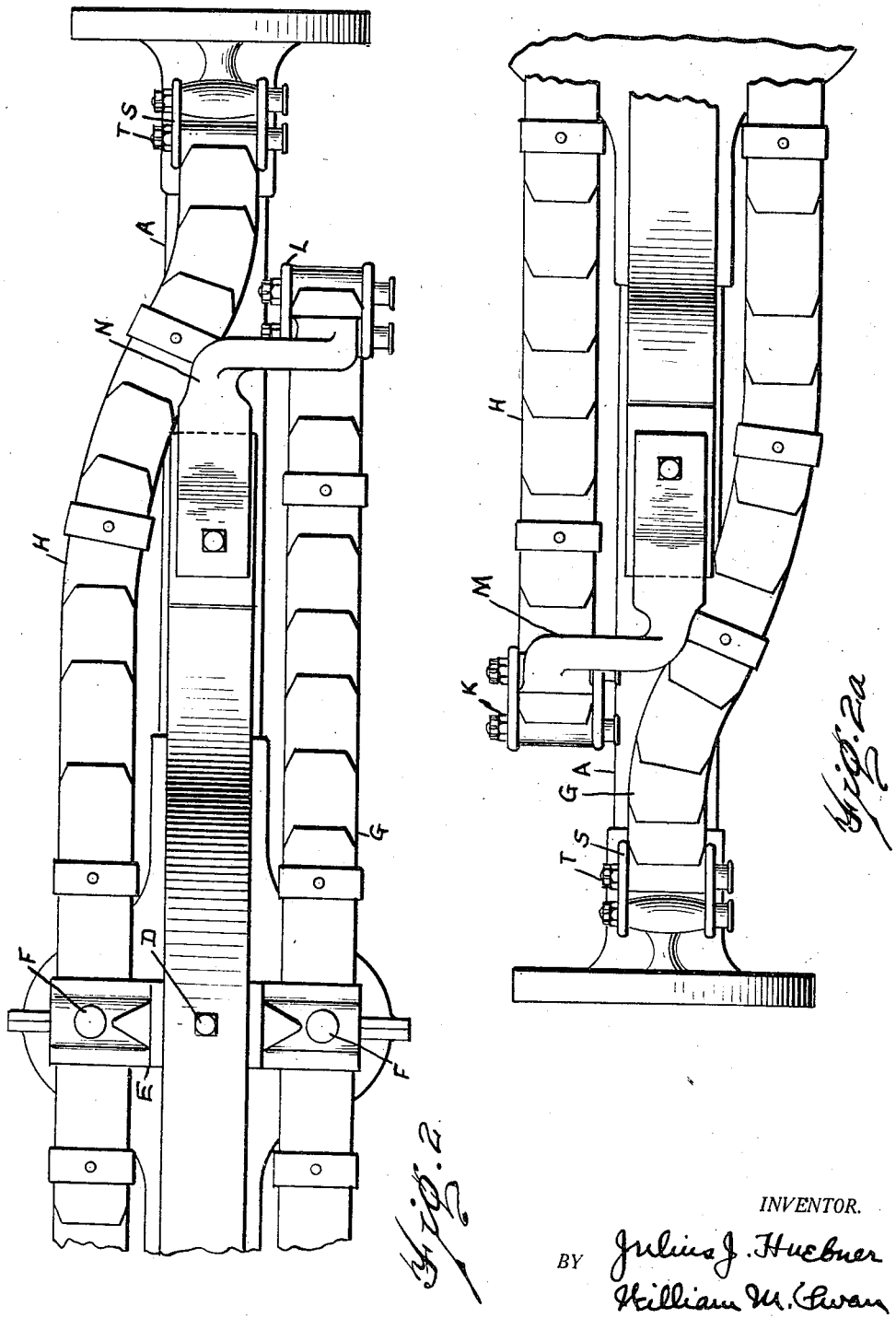
Figure 3:
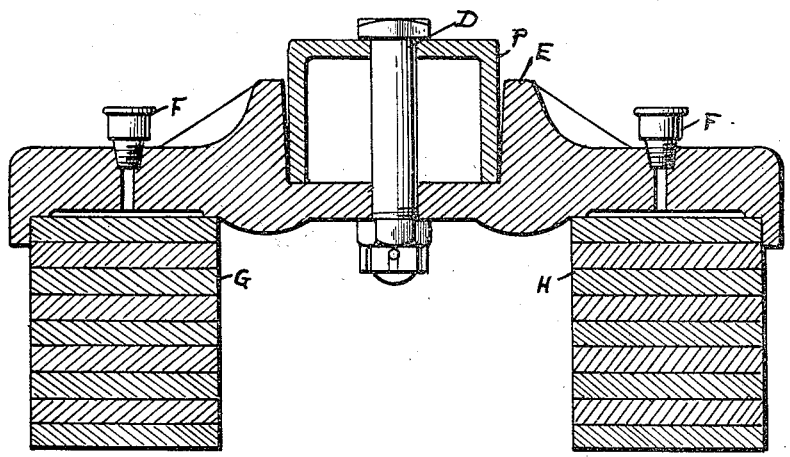
Figure 3 is a large scale sectional elevation lengthwise of the vehicle, taken along the line 3—3 of Figure 1, and looking in the direction of the arrows there shown.
Figure 4:
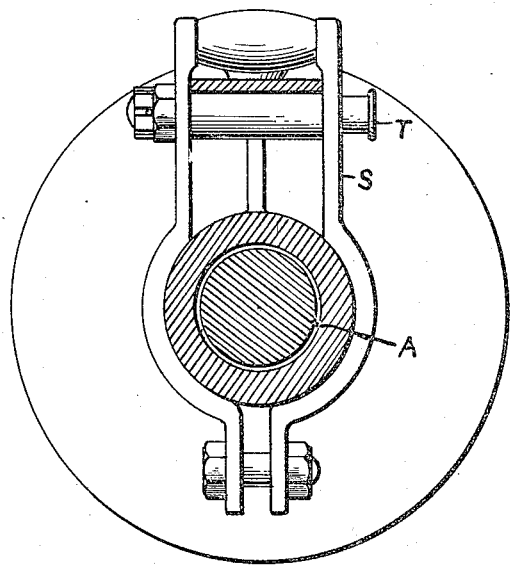
Figure 4 is an end view on a large scale of one of the clamping members, used to connect a lower end of a spring with the axle, being taken along the line 4—4 of Figure 1, and looking in the direction of the arrows there shown.

As brought out particularly in Figures 2 and 2ᵃ, each of the springs G and H, in addition to its upward curve illustrated in Figure 1 for the purpose of giving resiliency, is also S-curved near its end, when viewed horizontally, so that, in spite of the fact that the larger portion of the spring's mass does not lie directly over the axle, the outer end of each bends over it, and extends parallel therewith, so that its end may be united, as by the shackle S and bolts T, to the adjacent end of the vehicle axle A, so that, as regards whatever weight is imposed upon the springs, the thrust upon the axle, as well as the transmission from the axle of road jolts, is directly in a vertical plane. It will also be obvious that, thanks to the goose-neck members M and N, the real connection of the upper or free end of each spring with the cross bar lies in the same vertical plane as the connection of its lower end with the axle, this being brought out particularly in Figures 2 and 2ᵃ; strains upon the springs G and H, coming from either direction, are therefore kept in the same vertical plane, and the suspension of the wagon body so balanced that the maximum of easy riding qualities is assured with a minimum of twisting strain upon the axle. And similarly, whatever end thrust is put upon the springs, due to the wavering of the vehicle from side to side is maintained in a straight line, instead of to one side or the other of the axle, in spite of the fact that the springs are crossed; in other words, the goose neck at the upper end of each spring unites with the S-bend at the lower end of each spring to compensate for the crossing of the springs and keeps their strain-transmitting portions in the vertical plane of the axle.

What I claim is:

Means for effecting the resilient suspension of a vehicle body upon its axle, comprising a yoke member and a cross bar member depending from the body, a pair of spring members each having a slidable engagement with said yoke member, and each of said spring members being curved in horizontal and vertical planes, a goose-neck connecting the upper end of each spring member with the cross bar member, and means for connecting the bent lower end of each spring member with that end of the axle on the opposite side of the vehicle from that whereon its corresponding goose-neck connection is located.

In testimony whereof, I sign this specification in the presence of two witnesses.

JULIUS J. HUEBNER.

Witnesses:
WILLIAM M. SWAN,
JEFFERSON G. THURBER.